United States Patent

Martin et al.

(10) Patent No.: US 8,634,939 B2
(45) Date of Patent: Jan. 21, 2014

(54) METHOD AND SYSTEM FOR VEHICLE SPEED CONTROL

(75) Inventors: Douglas Raymond Martin, Canton, MI (US); Matthew Allen Warner, Saline, MI (US); Mathew Alan Boesch, Plymouth, MI (US); Fazal Urrahman Syed, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 216 days.

(21) Appl. No.: 13/231,261

(22) Filed: Sep. 13, 2011

(65) Prior Publication Data

US 2013/0066493 A1   Mar. 14, 2013

(51) Int. Cl.
*G06F 17/00* (2006.01)

(52) U.S. Cl.
USPC .......... 700/22; 701/36; 701/51; 701/70; 701/72; 701/74; 715/764; 715/853; 715/854; 715/855; 715/864; 180/165; 180/179; 180/197; 477/125; 477/184; 477/186

(58) Field of Classification Search
USPC .......... 701/22, 36, 51, 70, 72, 74, 78, 95; 715/764, 866, 864, 855, 854, 853; 180/165, 179, 197; 123/352, 493; 303/3, 24.1; 280/11.215; 477/125, 184, 477/186; 192/221

See application file for complete search history.

(56) References Cited

U.S. PATENT DOCUMENTS

| | | | |
|---|---|---|---|
| 5,788,597 A | 8/1998 | Boll et al. | |
| 6,188,945 B1* | 2/2001 | Graf et al. | 701/58 |
| 6,202,776 B1* | 3/2001 | Masberg et al. | 180/65.22 |
| 7,410,447 B2 | 8/2008 | Jamzadeh | |
| 7,676,313 B2 | 3/2010 | Ortmann et al. | |
| 7,908,067 B2 | 3/2011 | Soliman et al. | |
| 7,971,668 B2* | 7/2011 | Ando et al. | 180/65.265 |
| 2008/0108477 A1 | 5/2008 | Noll | |
| 2009/0145673 A1 | 6/2009 | Soliman et al. | |
| 2009/0159351 A1* | 6/2009 | Ando et al. | 180/65.265 |
| 2009/0299559 A1 | 12/2009 | Shimohira et al. | |
| 2013/0066493 A1* | 3/2013 | Martin et al. | 701/22 |

* cited by examiner

*Primary Examiner* — McDieunel Marc
(74) *Attorney, Agent, or Firm* — Julia Voutyras; Alleman Hall McCoy Russell & Tuttle LLP (57) ABSTRACT

Methods are provided for controlling a vehicle speed during a downhill travel. Based on the estimated grade of the downhill travel and further based on an input received from the operator, different combinations of an engine braking torque and a regenerative braking torque are used to maintain the vehicle speed during the downhill travel. A battery rate of charging is also adjusted based on the duration or distance of the downhill travel, as indicated by the operator input.

20 Claims, 5 Drawing Sheets

METHOD AND SYSTEM FOR VEHICLE SPEED CONTROL

FIELD

The present application relates to adjusting engine operation to control a vehicle speed, in particular when the vehicle is traveling downhill.

BACKGROUND AND SUMMARY

Vehicles may be configured with downhill speed control systems that allow a vehicle speed to be maintained when traveling downhill by limiting vehicle acceleration on the downhill grade. For example, in hybrid electric vehicles (HEVs) that can use an engine or a battery-powered motor to propel the vehicle, various approaches involving wheel braking and regenerative braking can be used to control the vehicle speed.

One example approach is shown by Jamzadeh in U.S. Pat. No. 7,410,447. Therein, a speed control system is adapted to absorb the grade-induced energy so that the vehicle does not accelerate and an established vehicle speed can be maintained. Vehicle speed control is automatically triggered responsive to a predefined amount of throttle release. Further, the amount of energy absorbed is based on the difference between the desired speed and the actual vehicle speed. In one example, the grade-induced energy may be absorbed by an electric motor/regenerator of the hybrid electric vehicle and stored in the attached battery or accumulator. Alternatively, the grade-induced energy may be absorbed by internal clutch elements or wheel brakes.

However, the inventors herein have identified a potential issue with such an approach. The operating life and performance characteristics of a system battery of the hybrid electric vehicle may be degraded. Specifically, during regenerative braking, irrespective of the grade of the vehicle, the battery may be charged as fast as possible using faster and deeper rates of charging and higher current levels. Rapid charging or discharging of the battery leads to battery heating which may adversely affect the operating life and storage capacity of the battery, as well as battery performance over the rest of the trip. Reduced battery performance may also affect the performance and fuel efficiency of the electric vehicle.

In one example, the above issue may be at least partly addressed by a method for a vehicle including an engine and a battery-powered motor. In one embodiment, the method comprises, adjusting a ratio of engine braking torque relative to regenerative braking torque applied to the vehicle during a downhill travel based on an estimated grade of the downhill travel and an operator input. In this way, in response to an operator input indicative of a sufficiently long downhill segment, a smaller regenerative braking torque and lower battery charging rate can be used to improve the life and performance of the battery.

In one example, a vehicle operator may indicate an upcoming long downhill travel segment by pressing a button (e.g., a downhill vehicle speed assistance request button). Accordingly, a larger engine braking torque and a smaller regenerative braking torque may be applied to maintain a desired downhill vehicle speed. Additionally, the vehicle battery may be charged at a slower rate over the entire duration of the downhill travel to improve the battery life. In comparison, if no input is received from the operator, a smaller engine braking torque and a larger regenerative braking torque may be used along with a transmission downshift operation to maintain the desired downhill vehicle speed. Additionally, the vehicle battery may be charged at a faster rate to increase the amount of energy captured during downhill travel.

In this way, a larger engine braking torque may be applied to maintain a downhill vehicle speed and a smaller charging rate may be applied to a vehicle battery during a downhill travel with a longer charging opportunity. As a result, battery performance may be improved, thereby improving the useable life of the battery as well as performance and fuel efficiency of a hybrid electric vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
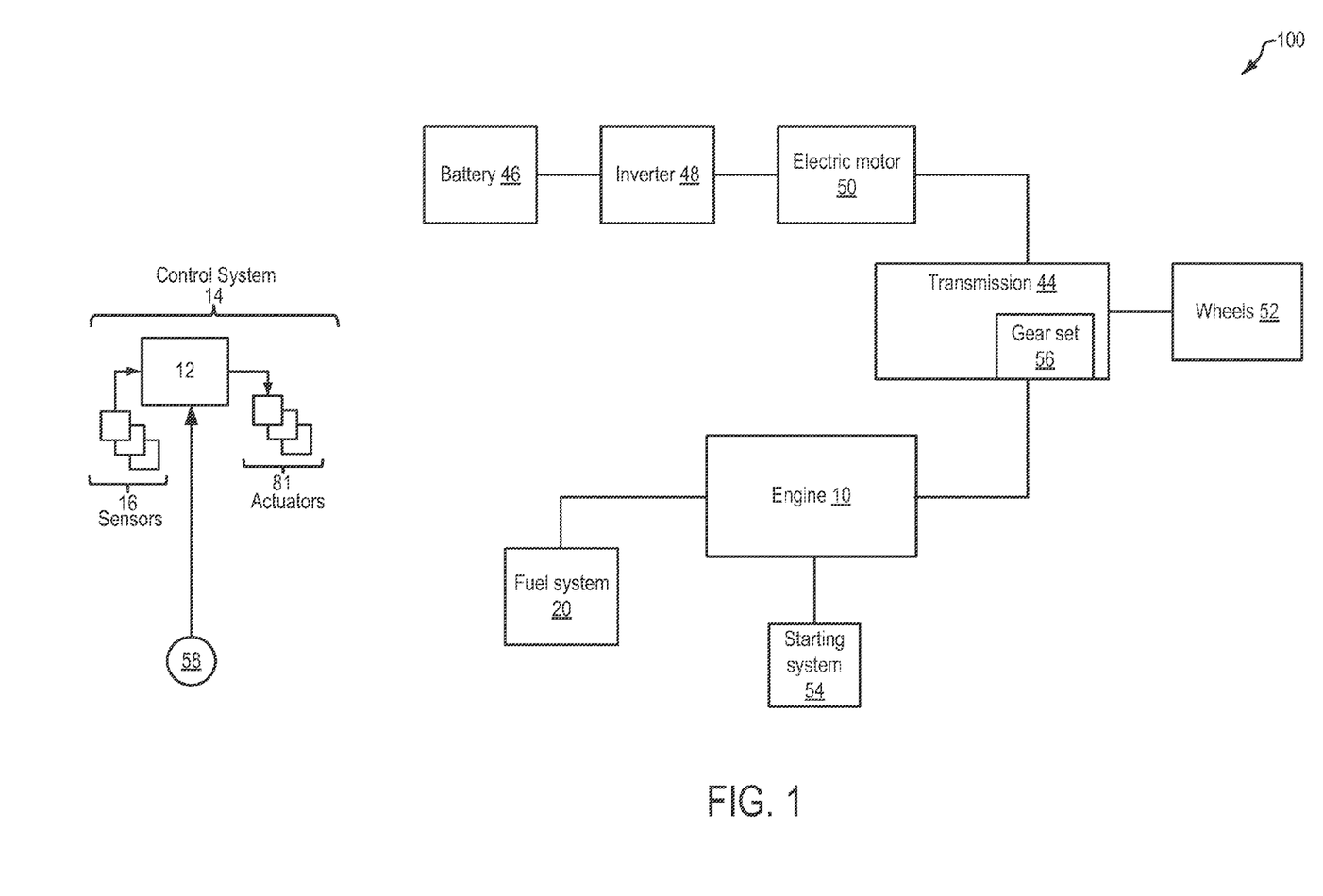
FIG. 1 illustrates an example hybrid vehicle system.
Figure 2:
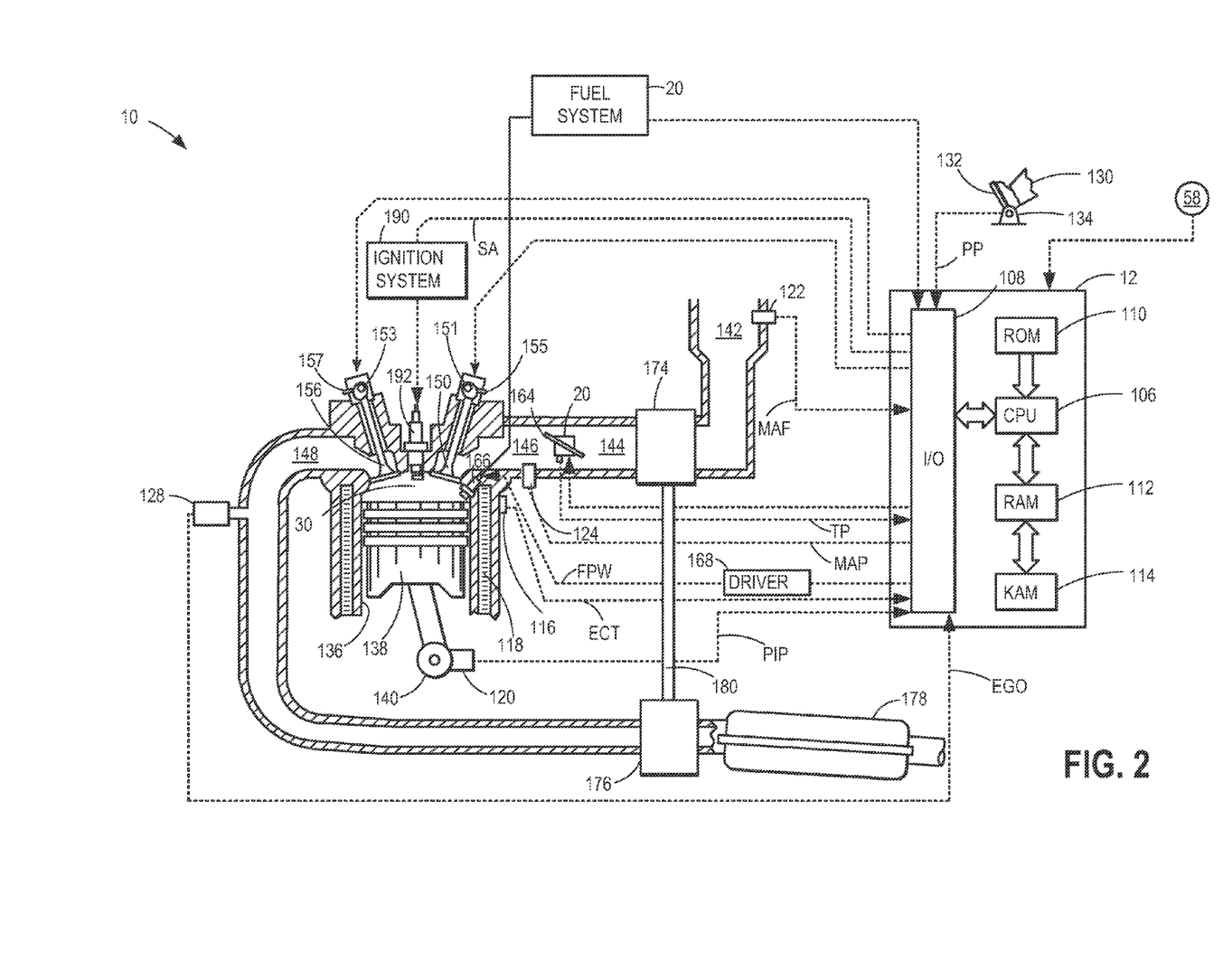
FIG. 2 illustrates an example internal combustion engine.

The following description relates to systems and methods for operating a hybrid vehicle, such as the hybrid electric vehicle (HEV) of FIGS. 1-2. During downhill travel, based on the estimated grade and further based on an input received from the vehicle operator, a combination of engine braking torque and regenerative braking torque may be used to maintain the vehicle at a predetermined downhill vehicle speed. An engine controller may be configured to perform a control routine, such as the routine of FIG. 3, to adjust a ratio of engine braking torque relative to regenerative braking torque used to maintain the downhill vehicle speed. The controller may further adjust a charging rate of a battery of the HEV. As illustrated in the example adjustments of FIGS. 4-5, in response to an operator input indicating that downhill travel is on a grade of sufficiently long duration (or distance), the controller may apply more engine braking torque at an earlier time during downhill travel while charging the battery slowly. In this way, by adjusting the ratio of braking torques applied, as well as a battery charging rate during downhill travel, the battery performance can be improved while a downhill vehicle speed is maintained.

FIG. 1 depicts a hybrid propulsion system 100 for a vehicle. In the depicted embodiment, the vehicle is a hybrid electric vehicle (HEV). Hybrid propulsion system 100 includes an internal combustion engine 10. Engine 10 is coupled to transmission 44. Transmission 44 may be a manual transmission, automatic transmission, or combinations thereof. Transmission 44 may include a gear set 56 having a plurality of gears. Further, various additional components may be included, such as a torque converter, a final drive unit, etc. Transmission 44 is shown coupled to drive wheels 52, which may contact a road surface.

Transmission 44 may alternatively be driven by an electric motor 50. In the depicted embodiment, the motor is a battery-powered electric motor wherein electric motor 50 is powered by energy stored battery 46. Other energy storage devices that may be used to power motor 50 include a capacitor, a flywheel, a pressure vessel, etc. An energy conversion device, herein inverter 48, may be configured to convert the DC output of battery 46 into an AC output for use by electric motor 50. Electric motor 50 may also be operated in a regenerative mode, that is, as a generator, to absorb energy from vehicle motion and/or the engine and convert the absorbed energy to an energy form suitable for storage in battery 46. Furthermore, electric motor 50 may be operated as a motor or generator, as required, to augment or absorb torque during a transition of engine 10 between different combustion modes (e.g., during transitions between a spark ignition mode and a compression ignition mode).

Engine 10 may be started with an engine starting system 54, including a starter motor. In one example, the starter motor coupled to the engine may be battery-operated, wherein the starter motor is driven by energy from battery 46. In another example, the starter may be a powertrain drive motor, such as a hybrid power-plant connected to the engine by way of a coupling device. The coupling device may include a transmission, one or more gears, and/or any other suitable coupling device. The starter may be configured to support engine restart at or below a predetermined near zero threshold speed (e.g., below 50 or 100 rpm). In other words, by operating the starter motor of starting system 54, the engine 10 may be spun.

Hybrid propulsion system 100 may be operated in various embodiments including a full hybrid system, wherein the vehicle is driven by only the engine, only the electric motor, or a combination of both. Alternatively, assist or mild hybrid embodiments may also be employed, wherein the engine is the primary source of torque, and the electric motor selectively adding torque during specific conditions, such as during a tip-in event. Accordingly, hybrid propulsion system 100 may be operated in various modes of operation. For example, during an "engine-on" mode, engine 10 may be operated and used as the primary source of torque for powering wheels 52. During the "engine-on" mode, fuel may be supplied to engine 10 from fuel system 20 including a fuel tank. The fuel tank may hold a plurality of fuels, such as gasoline, or fuel blends, such as fuel with a range of alcohol (e.g., ethanol) concentrations including E10, E85, etc., and combinations thereof. In another example, during an "engine-off" mode, electric motor 50 may be operated to power the wheels. The "engine-off" mode may be employed during braking, low speeds, while stopped at traffic lights, etc. In still another example, during an "assist" mode, an alternate torque source may supplement and act in cooperation with the torque provided by engine 10.

Each of engine 10 and electric motor 50 may also be used to apply a braking torque on wheels 52 to reduce a vehicle speed. For example, as elaborated with reference to FIG. 3, during a downhill travel, after a vehicle operator has taken their foot off an accelerator pedal and a brake pedal, a vehicle may be maintained at a desired downhill vehicle speed by applying a braking torque that includes at least some engine braking torque and at least some regenerative braking torque. As used herein, the regenerative braking torque corresponds to a negative torque that is applied by the electric motor on the vehicle wheels via the vehicle driveline (e.g., transmission, torque converter, etc.). Specifically, excess kinetic energy corresponding to the excess vehicle speed (that is, the difference between the estimated vehicle speed and the desired vehicle speed) is converted to, and stored as, electrical energy in the battery coupled to the electric motor. In comparison, the engine braking torque (herein also referred to as a compression braking torque) is a negative torque applied by the engine on the vehicle wheels via the driveline. Specifically, the excess kinetic energy corresponding to the excess vehicle speed is taken away from the moving wheels and used to keep the engine spinning and to compress air in the engine cylinders, after fuel has been shut-off to the engine (in response to the preceding accelerator pedal foot-off event).

A ratio of engine braking torque relative to regenerative braking torque applied to the wheels may be adjusted during downhill travel based on the estimated (downhill) grade as well as based on an operator input (e.g., based on the presence or absence of an operator input indicative of a request for downhill vehicle speed assistance). The operator input may indicate a distance, duration, and/or grade of the downhill travel. In one example, operator input may be provided by the operator pressing a button 58 on the dashboard of the vehicle at the onset of (or just before) travelling downhill. Herein, by pressing button 58, the operator indicates that the duration (or distance) of a downhill grade is longer than a predetermined distance. Alternatively, the operator input may indicate that the downhill travel is of a sufficiently long distance, a sufficiently long duration, and/or a sufficiently steep grade to allow the vehicle to be operated in a first downhill mode with a higher ratio of engine braking torque relative to regenerative braking torque and with slower battery charging. Essentially, as elaborated in FIG. 3, by pressing button 58, the operator may activate a first downhill travel mode that prolongs battery life. In one example, where the first mode is a mountain-driving mode, by pressing button 58, the operator may request the mountain-driving mode.

In an alternate example, instead of pressing button 58 at the onset of the downhill travel, the operator may press button 58 anytime before the downhill segment of the road is reached, such as while the operator is driving on a preceding incline or a flat segment of the road. Herein, the first downhill mode of vehicle operation may be enabled, but not activated by the operator while the vehicle is in one of many drive gears (such as, when in Park, Reverse, or Neutral). That is, the vehicle may not be actively maintaining a vehicle speed as yet, but may be configured to shift into the first downhill travel mode and maintain a desired downhill vehicle speed with slower battery charging when appropriate downhill conditions are met. In one example, in response to button 58 being pressed, an indicator on the vehicle dashboard may be illuminated to notify the vehicle operator that he has requested the enabling or activation of the first downhill travel mode. The indicator may then remain illuminated as long as the first downhill travel mode is activate and/or enabled. As elaborated in FIG. 3, even if the operator has requested the first downhill travel mode by pressing button 58, the first downhill travel mode may be disabled or deactivated (at least temporarily) when the vehicle is in a Drive or Low gear, while the operator has his foot on the accelerator pedal or brake pedal, and also between drives. During these conditions, the illuminated indicator may be switched off.

In comparison, in the absence of the operator input, such as when the operator has not pressed button 58 at the onset of (or just before) downhill travel, a controller may determine that the duration (or distance) of the downhill grade is not longer than the predetermined distance, or that the downhill segment of the road is not of a sufficiently long distance, duration and/or grade to allow the vehicle to be operated in the first downhill mode. Accordingly, the operator may instead operate the vehicle in a second downhill mode with a lower ratio of engine braking torque relative to regenerative braking torque. In one example, as elaborated in FIG. 3, the second mode may be a general vehicle speed control mode (e.g., cruise control mode) that allows a vehicle speed to be maintained during uphill travel, flat road travel, and some downhill travel conditions. In comparison, the first mode may be configured to not be a general vehicle speed control mode. Rather, the first mode may be a special downhill speed control mode that allows only a vehicle downhill speed to be maintained with lower battery charging only during selected downhill travel conditions, and not during uphill or flat toad travel.

It will be appreciated that in still other embodiments, the vehicle may include other operator interactive devices (e.g., a dashboard touch-screen, etc.) via which the operator may indicate the length, duration, and/or grade of the downhill travel, and further indicate which downhill mode, or speed control mode, they want the vehicle to be operated in.

Hybrid propulsion system 100 may further include control system 14. Control system 14 is shown receiving information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. The control system may also send control signals to the actuators 81 based on input received from a vehicle operator via one or more buttons, on a vehicle dashboard, such as "downhill vehicle speed assistance" button 58, and/or via other operator interactive devices (e.g., a dashboard touch-screen, etc.). The various actuators may include, for example, the gear set, cylinder fuel injectors (not shown), an air intake throttle coupled to the engine intake manifold (not shown), etc. The control system 14 may include a controller 12. The controller may receive input data from the various sensors or buttons, process the input data, and trigger the actuators in response to the processed input data based on instruction or code programmed therein corresponding to one or more routines. An example control routine is described herein with regard to FIG. 3.

FIG. 2 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. As another example, input may be received from the vehicle operator regarding a desired mode of downhill travel based on a position of button 58, as previously discussed with reference to FIG. 1. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 20 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 20 may hold fuel with different qualities, such as different compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Figure 3:
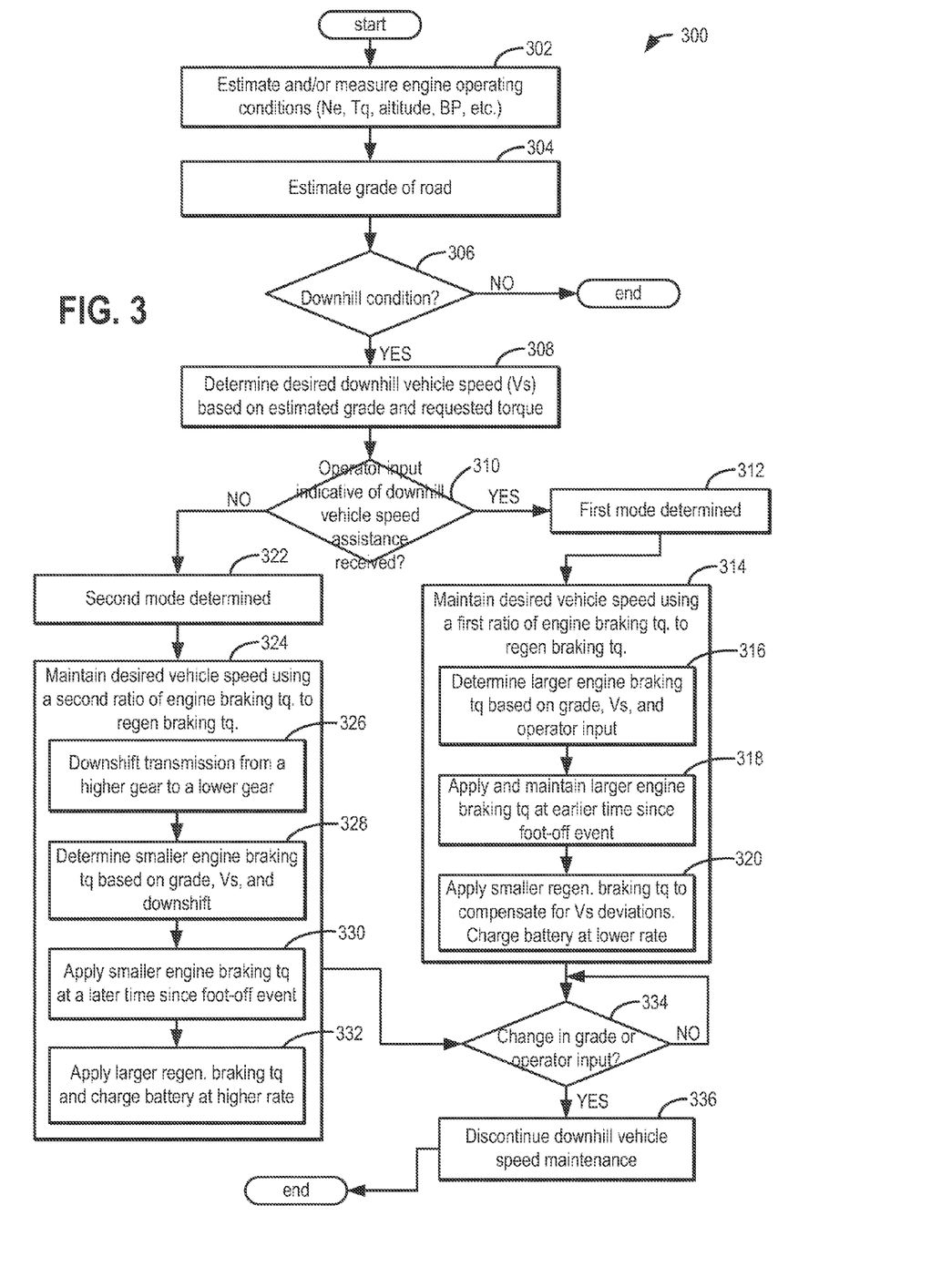
FIG. 3 illustrates a high level flow chart illustrating a routine for adjusting an amount of engine braking torque and regenerative braking torque applied on vehicle wheels during a downhill travel to maintain a downhill vehicle speed.

Now turning to FIG. 3, an example routine 300 is shown for adjusting a ratio of engine braking torque relative to regenerative braking torque applied to a hybrid vehicle during a downhill travel based on at least an estimated grade of a road and an operator input. In this way, the vehicle may maintain a desired downhill vehicle speed.

At 302, engine operating conditions may be estimated and/or measured. These may include, for example, engine speed, operator torque demand, altitude, barometric pressure, boost, exhaust temperature, vehicle speed, etc. At 304, a grade of the road on which the vehicle is travelling may be estimated. For example, it may be determined whether the vehicle is travelling on a flat road, commencing a downhill segment, or commencing an uphill segment. At 306, a downhill travel condition may be confirmed. This may include confirming that the vehicle is travelling, or about to travel, on a downhill segment of the road, and further that the operator's foot is off the accelerator pedal and the brake pedal (herein also referred to as a pedal foot-off event).

Upon confirmation of downhill travel, at 308, a desired downhill vehicle speed (Vs) to be maintained during downhill travel may be determined based on the estimated grade. The downhill travel speed may also be based on the torque requested by the vehicle operator (e.g., the prevalent torque command or a torque commanded at the onset of downhill travel). The predetermined vehicle speed may be an absolute speed determined from a look-up table based on the estimated grade (and torque command). Alternatively, the predetermined vehicle speed may be determined as a function of the estimated vehicle speed (and torque command) at the onset of the downhill travel. That is, the downhill vehicle speed may be a function of the vehicle speed at the time of the pedal foot-off event. In one example, as the estimated grade of the road increases (that is, the downhill grade is steeper), the desired downhill vehicle speed may be increased. Further, the predetermined downhill vehicle speed may be configured to lie within a predetermined vehicle speed range having a calibrated upper and lower limit. The upper and lower limits of the vehicle speed may be based on the position of the brake pedal and the accelerator pedal.

In one example, the downhill vehicle speed may be set to be the vehicle speed at the instant that the operator releases the accelerator pedal and/or the brake pedal (that is, the vehicle speed at the time of the pedal foot-off event). In another example, the downhill vehicle speed may be set to be the vehicle speed at the instant that the operator presses a button (e.g., button 58) to activate the first downhill travel mode. In still another example, where the button is pressed during an uphill segment of the road prior to a downhill segment of the road (so as to enable but not activate the first downhill travel mode), the downhill vehicle speed may be set to be the vehicle speed at the instant the operator releases either the accelerator pedal or the brake pedal to start the downhill travel.

In some embodiments, in addition to, or in place of, a desired downhill vehicle speed, a desired acceleration rate, or range, permitted during the downhill travel may be determined. For example, if the downhill travel includes a short flat section between two consecutive downhill sections, the vehicle speed may increase during each of the downhill sections and may require a braking torque to maintain the desired vehicle speed, however, during the flat section, the vehicle speed may temporarily decrease, and may be experienced as a sluggish segment by the driver. Thus, by allowing the vehicle to maintain a desired acceleration rate, the braking torque may be temporarily decreased, and the vehicle speed may be correspondingly increased during the flat section to reduce the sluggish feel experienced by the driver, while still maintaining an overall downhill vehicle speed. Herein, by limiting excess vehicle acceleration hill cresting may be mitigated.

Further still, the predetermined vehicle speed may be adjusted during downhill travel based on (instantaneous) changes in the position of the brake pedal and the accelerator pedal. As elaborated below, based on operator input indicative of the operator's desire to accelerate and increase the predetermined downhill vehicle speed (by pressing the accelerator pedal), or decelerate and decrease the predetermined vehicle speed (by pressing the brake pedal), while the vehicle is operating in the first downhill travel mode, the predetermined vehicle speed may be adjusted.

At 310, it may be determined whether an operator input indicative of a downhill vehicle speed has been received. Herein, the operator input may be indicative of a request for downhill vehicle speed assistance. As such, the operator input may indicate that the period of downhill grade is sufficiently long, for example, longer than a predetermined distance. However, in alternate embodiments, the operator input may be indicative of a sufficiently long (in terms duration) downhill travel segment, and/or a sufficiently steep (in terms of downhill grade) downhill segment of the road.

In still another example, the operator input may be indicative of an operator request for assistance in maintaining a downhill vehicle speed with slower battery charging for prolonging battery life. For example, an operator input (or an operator request for downhill vehicle speed assistance) may be confirmed if the vehicle operator has pressed a button (such as button 58 of FIG. 1) on the dashboard of the vehicle at the onset of (or just before) the downhill travel. Alternatively, the operator may provide the input via a touchscreen interface of the vehicle. As such, by explicitly requesting downhill assistance, the operator may be requesting that the vehicle be operated in the first downhill travel mode wherein based on the a priori knowledge of a sufficiently long downhill travel segment, a ratio of engine braking torque to regenerating braking torque can be appropriately adjusted and a battery charging rate can be decreased to improve battery life. An example of maintaining a downhill vehicle speed while operating the vehicle in the first downhill mode is elaborated in FIG. 4.

In comparison, in the absence of the operator input, the engine controller may (automatically) operate the vehicle in a second downhill travel mode wherein based on the availability of an upcoming battery charging opportunity, and without the a priori knowledge of the duration, distance, and/or grade of the charging opportunity, the ratio of engine braking torque to regenerative braking torque is adjusted differently and a battery charging rate can be increased to maximize the charging potential. An example of maintaining a downhill vehicle speed while operating the vehicle in the second downhill travel mode is elaborated in FIG. 5. In one example, the second downhill travel mode may be a default downhill travel mode that is automatically selected during downhill travel and overridden only upon receiving the operator input. In another example, the downhill travel mode may be general speed control mode that is used to maintain a vehicle speed during vehicle travel irrespective of the grade of the road.

If the operator input is confirmed, then at 312, a first downhill travel mode is determined by the engine controller. In one example, wherein the second downhill travel mode is the default travel mode, in response to the operator input, the second downhill travel mode may be overridden by the first downhill travel mode. Upon confirmation of the first downhill travel mode, at 314, the routine includes maintaining the predetermined vehicle speed using a first ratio of engine braking torque to regenerative braking torque. Specifically, at 316, the adjustment includes increasing a ratio of engine braking torque to regenerative braking torque applied to the vehicle during the downhill travel in response to the operator input being received. The larger engine braking torque applied during the downhill travel may be based on the estimated grade, the desired vehicle speed (or desired rate of acceleration), and the operator input. At 318, the larger engine braking torque may be applied at a first, earlier time since a first pedal foot-off event (that is, at a first time since the operator takes their foot off the accelerator and brake pedals). For example, the larger engine braking torque may be applied immediately in response to the pedal foot-off event. The engine braking torque may then be maintained during the downhill travel and may not be further adjusted responsive to any deviations of the vehicle speed from the predetermined vehicle speed.

At 320, the routine includes applying a smaller regenerative braking torque based on deviations of the vehicle speed from the predetermined vehicle speed. For example, as elaborated in FIG. 4, in response to a sudden increase or decrease in the downhill vehicle speed, the engine braking torque is maintained while the regenerative braking torque is continuously adjusted during the downhill travel based on the deviations. Additionally, at 320, a rate of charging of a system battery that powers the electric motor of the hybrid vehicle may be adjusted based on the estimated grade and the operator input. Herein, the adjustment includes charging the battery at a lower rate in response to an operator input being received. That is, as the distance, duration, and/or grade of the downhill travel indicated by the operator increases, the rate of charging of the battery is decreased. In this way, it is possible to take advantage of a priori information received from the operator about the upcoming downhill travel, and the corresponding charging opportunity to better utilize a longer downhill travel (that is, a longer charging duration or distance) through a lower charging rate. The reduced charging rate not only provides a more efficient power transfer to the battery, but also reduces degradation of the battery while still reaching a desired battery state of charge at the conclusion of the downhill travel.

It will be appreciated that the vehicle may include a transmission coupled to the engine, but when operating the vehicle in the first downhill travel mode, the transmission may be maintained in gear and the transmission gear may not be shifted during the downhill travel. That is, the maintaining of the predetermined vehicle speed during the downhill travel may be accomplished via the engine braking torque and regenerative braking torque only and without shifting the transmission gears. As further elaborated below, the operator input requesting the maintaining of the vehicle downhill speed via operation of the vehicle in the first downhill travel mode may be automatically cancelled (at least temporarily) in response to the estimated grade being less than a threshold (e.g., a sudden change in the grade) or an increased (or decreased) engine torque requested from the operator.

If no operator input is received at 310, then at 322, a second downhill travel mode (different from the first downhill ravel mode) may be determined by the engine controller. While the depicted embodiment shows the second mode being selected in response to no operator input being received (e.g., as a default mode), in an alternate embodiment, the second downhill travel mode may be confirmed in response to an operator input indicative of a downhill travel segment that is not sufficiently long or sufficiently steep.

Accordingly, at 324, the routine includes maintaining the predetermined vehicle speed via applying a second ratio of engine braking torque to regenerative braking torque, the second ratio different from the first ratio applied during the first downhill travel mode. Specifically, at 326, the transmission may be downshifted from a higher gear to a lower gear. As such, when operating in the second downhill travel mode, the transmission may be downshifted at any time during the downhill travel in response to an estimated vehicle speed rising above the predetermined vehicle speed. In one example, the vehicle speed may start to increase at the onset of the downhill travel once the vehicle operator has released their foot from the accelerator and brake pedal. Herein, the transmission may be downshifted at the onset of the downhill travel. Alternatively, the vehicle speed may temporarily increase after an amount of time since the applying of the second ratio of engine braking torque to regenerative braking torque. Herein, the transmission may be downshifted during the downhill travel responsive to the vehicle speed spike. The downshift may be based on the amount of retarding torque needed to bring the vehicle speed to the predetermined vehicle speed. Thus, when the vehicle speed rises above the predetermined vehicle speed by a larger amount, a larger downshift (e.g., from a third gear to a first gear) may be performed while when the vehicle speed rises above the predetermined vehicle speed by a smaller amount, a smaller downshift (e.g., from a third gear to a second gear) may be performed. It will be appreciated that in alternate embodiments, where the transmission does not include discrete gears that may be stepwise downshifted (e.g., in an eCVT embodiment), the controller may be configured to adjust the eCVT to raise the engine speed continuously during the downhill travel to exactly meet the braking requirement.

At 328, the adjustment includes decreasing the ratio of engine braking torque to regenerative braking torque applied to the vehicle during the downhill travel in response to no operator input being received. The smaller engine braking torque applied during the downhill travel may be based on the estimated grade, the desired vehicle speed (or desired rate of acceleration), and the transmission downshift (if performed). At 330, the smaller engine braking torque may be applied at a second, later time since the second pedal foot-off event (that is, the second time may be later than the first time at which the engine braking torque is applied during the first downhill travel mode). For example, the smaller engine braking torque may be applied after a preceding transmission downshift. As another example, the regenerative braking torque may be applied as soon as the pedal foot-off event occurs and the engine braking torque may be applied after a duration since the applying of the regenerative braking torque. The smaller engine braking torque may be further varied during the downhill travel, in response to vehicle speed deviations, in coordination with corresponding, and proportional, adjustments to the applied regenerative braking torque.

At 332, the routine includes applying a larger regenerative braking torque. The larger regenerative braking torque applied during the downhill travel may also be based on the estimated grade and the desired vehicle speed. Further, in response to deviations of the actual (or estimated) vehicle speed from the predetermined vehicle speed, the regenerative braking torque may be correspondingly adjusted. For example, as elaborated in FIG. 5, in response to a sudden increase or decrease in the downhill vehicle speed, each of the engine braking torque and the regenerative braking torque may be adjusted. Additionally, at 332, a rate of charging of the system battery is adjusted based on the estimated grade. Specifically, the adjustment includes charging the battery at a higher rate in response to no operator input being received. That is, in the absence of operator input, the rate of charging of the battery is increased, for example, to a maximum charging rate, to maximize the amount of energy transfer that is possible during the downhill travel. Herein, in the absence of a priori information from the operator about the length, duration, or grade of the downhill travel, a shorter charging opportunity is anticipated and accordingly a larger charging rate is used to increase the charging potential of the downhill travel, and without being primarily concerned about the battery life. In one example, the higher charging rate may allow the battery to reach the desired battery state of charge at an earlier time as compared to during the first downhill travel mode.

In one example, based on the downhill vehicle speed predetermined at 308, a total braking torque to be applied to the wheels may be determined. Then, based on the operator input, and the selected downhill travel mode, the distribution of that total braking torque between the engine braking torque and the regenerative braking torque may be determined. In one example, the total braking torque may be stored in a look-up table of the controller as a function of the determined vehicle speed, and optionally, as a function of the selected downhill travel mode. The total braking torque may be stored as an absolute value or as a range having a specified upper and lower limit of the applied braking torque. For example, the lower limit may be adjusted such that, when travelling downhill in the first downhill travel mode, the vehicle operator feels nothing lower than a creep speed when the feet are off the pedals. Thus, the braking torque may be blended out to provide no additional braking at vehicle speeds below creep speed (e.g., below 3.5 kph). As another example, the upper limit may be adjusted such that, when operating in the first downhill travel mode, a total wheel torque of the vehicle wheels is not greater than a corresponding flat ground torque. That is, when the first downhill travel mode is activated, the braking torque may not be lower than a braking torque applied to the vehicle wheels when button 58 is not applied (e.g., during cruise control). Further, the range of the total braking torque (resulting from the combination of the engine braking torque and regenerative braking torque) applied during the first downhill travel mode may be varied during the downhill travel based on a drive gear selected by the operator (that is, whether the vehicle is in park, neutral, low, reverse, etc.).

In some embodiments, the downhill vehicle speed maintenance may be temporarily disabled in response to the brake pedal and/or accelerator pedal being pressed while the downhill assistance request is active (that is, while button 58 is pressed), and then re-enabled after the brake pedal and/or accelerator pedal has been released. Herein, the downhill vehicle speed may be adjusted, in particular during the first downhill travel mode, responsive to changes in the position of the accelerator pedal and/or brake pedal during the downhill travel. In one example, the operator may temporarily press (e.g., for a shorter, less than a threshold duration) on the accelerator pedal (while the brake pedal is released) when the vehicle is travelling downhill with the intent of raising the downhill vehicle speed. Herein, in response to the operator accelerator pedal event received while the vehicle is traveling downhill in the first downhill travel mode, the predetermined vehicle speed may be readjusted to the (higher) vehicle speed at the instant the accelerator pedal is released. Consequently, the vehicle speed may be raised and the engine braking torque and regenerative braking torques may be adjusted accordingly. As such, the braking torques and downhill vehicle speed control may be temporarily disabled and not applied while the accelerator pedal is pressed, and then re-enabled when the accelerator pedal is released.

In another example, the operator may temporarily press (e.g., for a shorter, less than a threshold duration) on the brake pedal (while the accelerator pedal is released) when the vehicle is travelling downhill with the intent of lowering the downhill vehicle speed. Herein, in response to the operator brake pedal event received while the vehicle is traveling downhill in the first downhill travel mode, the predetermined vehicle speed may be readjusted to the (lower) vehicle speed at the instant the brake pedal is released. Consequently, the vehicle speed may be reduced and the engine braking torque and regenerative braking torques may be adjusted accordingly. As such, the downhill vehicle speed control may be temporarily disabled while the brake pedal is pressed, and then re-enabled when the accelerator pedal is released. However, the engine braking torque and regenerative braking torque may be increased while the brake pedal is applied to provide the increased retarding torque requested by the operator. Upon release of the brake pedal, the engine braking torque and regenerative braking torque may be readjusted.

As such, the downhill vehicle speed control may be performed only during a downhill travel. That is, the first mode of downhill travel may not affect engine control, or vehicle speed control, during travel on an incline or a flat road. Therefore, at 334, while a vehicle downhill speed is maintained by operating the vehicle in the first downhill travel mode (at 314) or the second downhill travel mode (at 324), it may be determined whether the operator input has changed and/or whether the hill travel grade has changed. The change in the operator input may include, for example, the operator disabling button 58 and not requesting further assistance with downhill speed maintenance. As another example, the change in operator input may include the operator pressing the brake pedal for a threshold (e.g., longer) duration to reduce the vehicle speed, or the operator pressing the accelerator pedal for the threshold (e.g., longer) duration to increase the vehicle speed. The change in hill travel grade may include a change that is greater than a threshold (that is, not responsive to a flat grade in-between consecutive downhill segments). In one example, it may be determined whether an uphill condition (or uphill travel segment) following the previous downhill condition is present. As such, the vehicle downhill travel speed may be maintained with the vehicle continuing to be operated in the selected downhill travel mode (that is, with the corresponding ratios of engine braking torque and regenerative braking torque, and with the corresponding battery charging rate) until a change in grade occurs and/or until a revised operator input is received. In response to the change in grade and/or the revised operator input, at 336, the downhill vehicle speed maintenance may be discontinued. For example, in response to an incline, the vehicle speed maintenance may be stopped so that the vehicle speed can be eventually increased.

While the depicted embodiment shows downhill vehicle speed maintenance discontinued in response to a change in grade, or change in operator input, when the vehicle is traveling in the first or second downhill travel mode, it will be appreciated that in an alternate embodiment, only the downhill vehicle speed maintenance via the first downhill travel mode may be discontinued. Herein, the second travel mode may be general speed control mode and a different vehicle speed control may be subsequently performed in response to the change in grade and/or operator input.

In this way, a vehicle downhill speed may be maintained by adjusting the ratio of engine braking torque relative to regenerative braking torque. At the same time, based on operator input indicative of a sufficiently long downhill segment, a battery charging rate can be lowered so that the battery is gradually charged to improve the life and performance of the battery.

Figure 4:
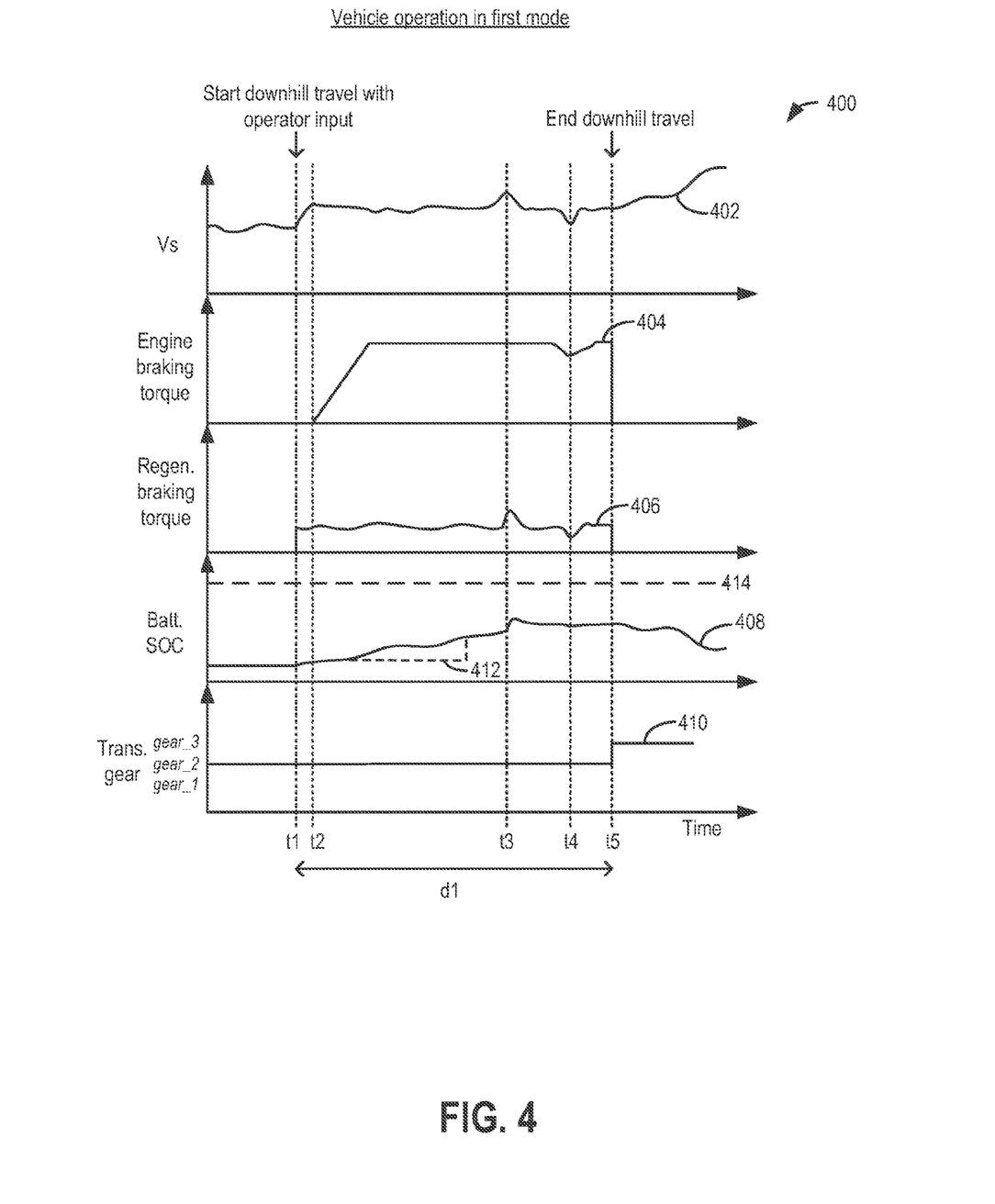
FIGS. 4-5 illustrate examples of maintaining a downhill vehicle speed using different combinations of engine braking torque and regenerative braking torque.
Figure 5:
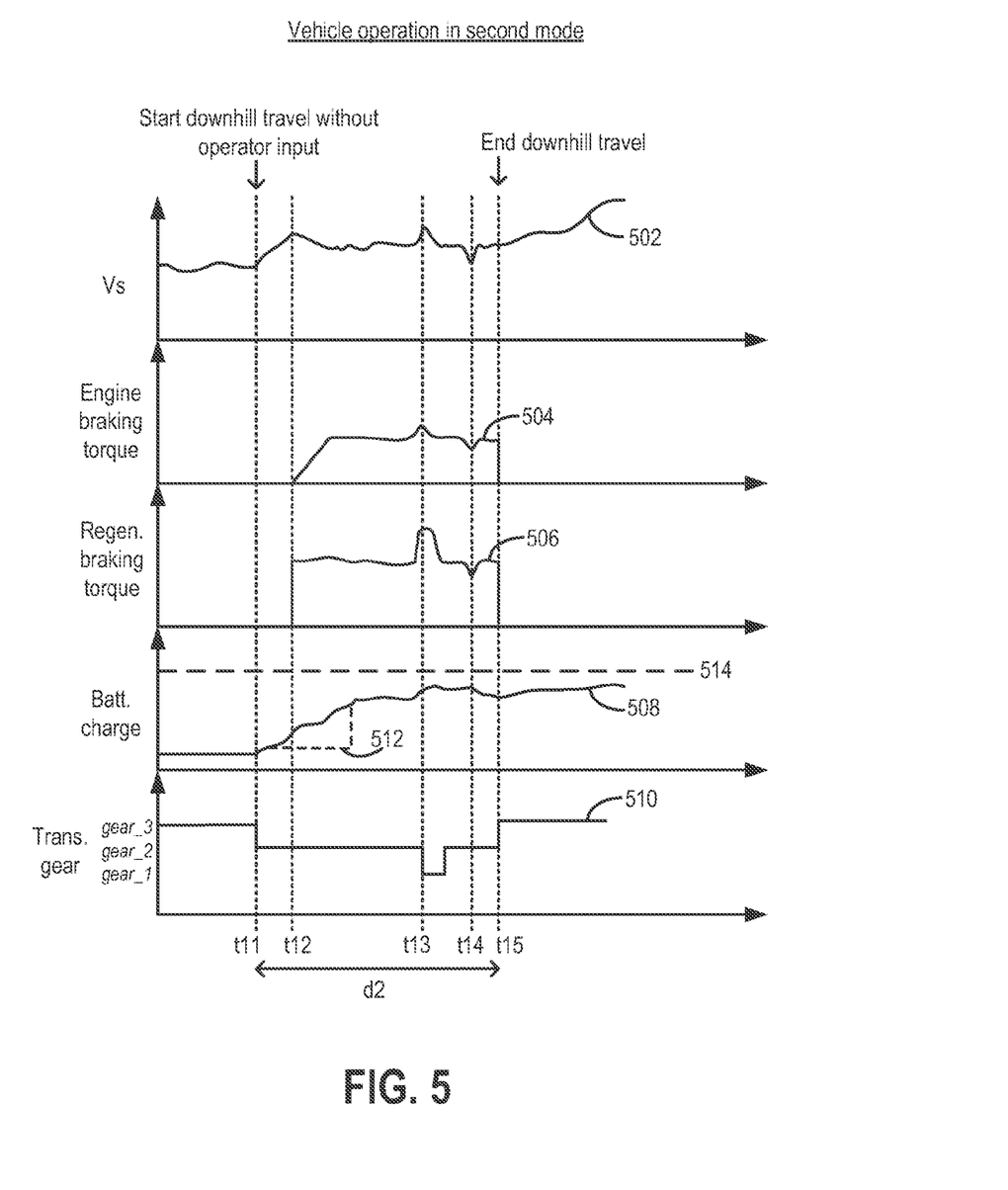

Now turning to FIGS. 4-5, example scenarios of vehicle downhill speed maintenance are shown. Specifically, FIG. 4 depicts a first downhill condition wherein the vehicle is operated in a first downhill travel mode (as previously discussed at 314 of FIG. 3) upon receipt of operator input, while FIG. 5 depicts a second downhill condition wherein the vehicle is operated in a second downhill travel mode (as previously discussed at 324 of FIG. 3) upon receipt of no operator input. FIGS. 4-5 depict different combinations of engine braking torque and regenerative braking torque being used to maintain the downhill vehicle speed, as well as differences in a battery charging rate.

FIG. 4 depicts a first vehicle downhill travel operation at map 400 wherein graph 402 depicts changes in a vehicle speed over time, graph 404 depicts the engine braking torque applied over the duration, graph 406 depicts the regenerative braking torque applied over the duration, graph 408 depicts changes in a battery state of charge (SOC), and graph 410 depicts changes in a transmission gear of a transmission coupled to the vehicle engine.

In the depicted example, before t1, the vehicle may be moving at a given vehicle speed with no engine braking torque or regenerative braking torque applied, and with a given battery SOC. At t1, the vehicle may approach a downhill travel segment and the operator may take his foot off the brake and accelerator pedal. Additionally, the operator may press a button requesting assistance in vehicle downhill speed maintenance with prolonged battery life (such as button 58 of FIG. 1). The operator input may be indicative that the upcoming first duration (duration d1 occurring from t1 to t5) of downhill travel is longer. Accordingly, during this first downhill condition, the vehicle may be operated in the first downhill travel mode. At t1, as the vehicle commences the downhill travel, the vehicle speed may temporarily increase (between t1 and t2) and then be maintained at a predetermined downhill vehicle speed (graph 402). Herein, an engine controller may apply a larger engine braking torque (graph 404) and a smaller regenerative braking torque (graph 406) to maintain the vehicle at the predetermined downhill vehicle speed.

The larger engine braking torque may be applied during the downhill travel at a first, earlier time since the pedal foot-off event. Thereafter the applied larger engine braking torque may be maintained. For example, the engine braking torque may be applied at t1, or soon after t1 (as depicted). In one example, the engine braking torque may be applied at the same time that the vehicle speed increases at the onset of the downhill travel (at t2). Herein, by applying the engine braking torque in response to the increase in vehicle speed at the onset of the downhill travel, and thereafter maintaining the applied engine braking torque, the vehicle speed may be maintained at the predetermined vehicle speed.

Further deviations from the predetermined vehicle speed may then be compensated for by adjusting the smaller regenerative braking torque. For example, in response to a sudden increase in vehicle speed at t3, the amount of regenerative braking torque applied may be temporarily increased while the engine braking torque is maintained. As another example, in response to a sudden decrease in vehicle speed at t4, the amount of regenerative braking torque applied may be temporarily decreased while the engine braking torque is maintained.

During the first downhill condition, based on the operator input indicative of a longer downhill travel duration d1, the battery may also be charged at a first, lower rate 412 (as determined by the slope of graph 408). The lower battery charging rate allows the battery to reach a desired SOC 414 by the end of the first (longer) duration of downhill travel, rather than earlier. As such, responsive to temporary changes in the regenerative braking torque (due to deviations of the vehicle speed from the predetermined downhill vehicle speed), corresponding temporary changes in the battery SOC (and the instantaneous battery charging rate) may also occur. In one example, in response to a sudden increase in the regenerative braking torque applied on the vehicle, the battery SOC may temporarily increase. In the same way, in response to a sudden decrease in the regenerative braking torque applied on the vehicle, the battery SOC may temporarily decrease. However, in some embodiments, the controller may be configured to adjust the braking torques (e.g., temporarily adjust the engine braking torque and the regenerative braking torque) responsive to vehicle speed deviations so as not to decrease the battery SOC. As such, the engine braking torque may be applied faster and more precisely than then regenerative braking torque. Therefore in some embodiments, based on the amount of braking torque desired to compensate for the vehicle speed deviation, the braking torques may be adjusted. For example, in response to a request for a larger braking torque (to adjust the vehicle speed deviation), a regenerative braking torque may be applied, while in response to a request for a smaller braking torque (to adjust the vehicle speed deviation), an engine braking torque may be applied.

During the first downhill travel mode, the vehicle speed may be maintained without shifting the transmission gear (graph 410). In the depicted example, the transmission may be in a transmission second gear (gear_2) at the onset of the downhill travel and may be maintained in the transmission second gear at least until the downhill travel has been completed, after which, the transmission may be shifted based on engine operating condition. In the depicted example, the vehicle operator may request an increase in the vehicle speed after t5 responsive to which the transmission may be upshifted from the transmission second gear to a transmission third gear (gear_3). Thus, in the downhill travel mode depicted in FIG. 4, the vehicle speed is maintained via the engine braking torque and regenerative braking torque only.

FIG. 5 depicts a second vehicle downhill travel operation at map 500 wherein graph 502 depicts change in a vehicle speed over time, graph 504 depicts the engine braking torque applied over the duration, graph 506 depicts the regenerative braking torque applied over the duration, graph 508 depicts changes in a battery state of charge (SOC), and graph 510 depicts changes in a transmission gear of a transmission coupled to the vehicle engine.

In the depicted example, before t11, the vehicle may be moving at a given vehicle speed with no engine braking torque or regenerative braking torque applied, with a given battery SOC, and with the transmission in gear (for example, a transmission third gear, gear_3). At t11, the vehicle may approach a downhill travel segment and the operator may take his foot off the brake and accelerator pedal. However, the operator may not have pressed the vehicle downhill speed assistance button, thereby providing no operator input indicative of the duration of the approaching downhill travel. As such, the second duration (duration d2 occurring from t11 to t15) of downhill travel during this second downhill condition may be shorter than the first duration (d1) of the first downhill condition of FIG. 4. In the absence of the operator input, an engine controller may be configured to anticipate a shorter downhill travel duration, and therefore a shorter battery charging opportunity. Accordingly, during this second condition, the vehicle may be operated in a second downhill travel mode.

At t11, as the vehicle commences the downhill travel, the vehicle speed may temporarily increase (between t11 and t12) and then be maintained at a predetermined downhill vehicle speed (graph 502). In response to the increase in vehicle speed, the engine controller may downshift the transmission from a higher gear to a lower gear (for example, from the transmission third gear (gear_3) to a transmission second gear (gear_2)). By downshifting the transmission, the amount of vehicle acceleration that is possible is reduced to assist in vehicle speed maintenance. The engine controller may then apply a smaller engine braking torque (graph 504) and a larger regenerative braking torque (graph 506) to maintain the vehicle at the predetermined downhill vehicle speed.

The larger regenerative braking torque may be applied during the downhill travel immediately after the pedal foot-off event, for example, at t11. The smaller engine braking torque may be applied during the downhill travel at a second, later time since the pedal foot-off event. For example, the engine braking torque may be applied at t12, following the transmission downshifting. In an alternate example, where no transmission shifting occurs immediately after the pedal foot-off event, the smaller engine braking torque may be applied at t12 in response to the increase in vehicle speed. Herein, t12 corresponds to a later time during the downhill travel as compared to t2 of FIG. 4.

In still another example, the controller may turn the engine off during the downhill travel. The engine may be turned off for some or all of the duration of the downhill travel. When the engine is switched off, zero engine (compression) braking torque may be provided and substantially all the braking torque may be provided by the regenerative braking torque. In this example, all the braking energy may be stored in the battery as charge.

Further deviations from the predetermined vehicle speed may be compensated for by adjusting both the engine braking torque and the regenerative braking torque. Further transmission downshifting may also be performed. For example, in response to a sudden increase in vehicle speed at t13, the transmission may be further downshifted (for example, from the transmission second gear (gear_2) to a transmission first gear (gear_1)). Additionally, an amount of regenerative braking torque and engine braking torque applied may be temporarily increased. As another example, in response to a sudden decrease in vehicle speed at t14, an amount of regenerative braking torque and engine braking torque applied may be temporarily decreased while the transmission gear is maintained or upshifted (as depicted). In an alternate embodiment, the transmission gear may be upshifted from the lower gear only after the downhill travel has been completed.

During the second downhill condition, in the absence of operator input, the battery may also be charged at a second, higher rate 512 (as determined by the slope of graph 508). The higher battery charging rate allows the battery to reach the desired SOC 514 before the end of the second (shorter) duration of downhill travel. That is, in the absence of information regarding the duration/distance of downhill travel, the battery is charged more aggressively to ensure that the charging potential of the downhill travel is optimized. As such, responsive to temporary changes in the regenerative braking torque (due to deviations of the vehicle speed from the predetermined downhill vehicle speed), corresponding temporary changes in the battery SOC (and the instantaneous battery charging rate) may also occur. For example, in response to the sudden increase in the regenerative braking torque applied on the vehicle, the battery SOC may temporarily increase. In the same way, in response to a sudden decrease in the regenerative braking torque applied on the vehicle, the battery SOC may temporarily decrease.

In some embodiments, the controller may be configured to adjust the braking torques (e.g., temporarily adjust the engine braking torque and the regenerative braking torque) responsive to vehicle speed deviations so as not to decrease the battery SOC. As such, the engine braking torque may be applied faster and more precisely than then regenerative braking torque. Therefore in some embodiments, based on the amount of braking torque desired to compensate for the vehicle speed deviation, the braking torques may be adjusted. For example, in response to a request for a larger braking torque (to adjust the vehicle speed deviation), a regenerative braking torque may be applied, while in response to a request for a smaller braking torque (to adjust the vehicle speed deviation), an engine braking torque may be applied.

While the example of FIG. 5 illustrates stepwise downshifting of the transmission, in alternate embodiments, such as where the transmission does not include discrete gears that may be stepwise downshifted (e.g., in an eCVT embodiment), the controller may adjust the eCVT to raise the engine speed continuously during the downhill travel to exactly meet the braking requirement. It will be appreciated that the examples depicted at FIGS. 4-5 illustrate a first duration of downhill travel during a first downhill condition (FIG. 4) that is longer than a second duration of downhill travel during the second downhill condition (FIG. 5), and wherein an estimated grade of downhill travel during the first downhill condition is the same as the estimated grade of downhill travel during the second downhill condition. However in an alternate embodiment, a first estimated grade of downhill travel during the first downhill condition (FIG. 4) may be greater than a second estimated grade of downhill travel during the second downhill condition, while a duration of downhill travel during the first downhill condition is the same as the duration of downhill travel during the second downhill condition. Herein, based on the differences in estimated grade as indicated by an operator, the vehicle may be operated in the first downhill travel mode with the battery charged at the first, lower rate and the engine braking torque applied at a first, earlier time during the first downhill condition, while in the second downhill condition, the vehicle may be operated in the second downhill travel mode with the battery charged at the second, higher rate and the engine braking torque applied at a second, later time. In still another embodiment, during the first downhill condition, the downhill travel may include a first, higher change in barometric pressure (that is, a greater change in altitude) since a preceding uphill travel, while during the second downhill condition, the downhill travel may include a second, lower change in barometric pressure (that is, a smaller change in altitude as compared to the change in altitude during the first downhill condition) since the preceding uphill travel.

In this way, by reducing the rate of charging of a vehicle battery, while prolonging the duration of charging of the battery during a downhill travel segment, when possible (such as based on a priori information from the vehicle operator), rapid heating of the battery due to frequent charging and discharging cycles can be reduced. As a result, the efficiency of the power capture can be increased while the life and performance of the battery is improved. At the same time, by adjusting the ratio of engine braking torque relative to regenerative braking torque applied on a vehicle during a downhill travel based on operator input regarding the downhill travel, vehicle speed maintenance during the downhill travel can be performed with improved battery life. Overall, the performance of a hybrid vehicle can be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle including an engine and a battery-powered motor, comprising:
adjusting a ratio and timing of applying engine braking torque relative to regenerative braking torque to the vehicle during a downhill travel based on an estimated grade and an operator input from an input device separate from an accelerator pedal and a brake pedal.

2. The method of claim 1, wherein the operator input is indicative of a request for downhill assistance, and wherein the input device separate from the accelerator pedal and the brake pedal is a button coupled to a dashboard of the vehicle.

3. The method of claim 1, wherein the operator input is indicative of a downhill grade being longer than a predetermined distance.

4. The method of claim 1, wherein the adjustment includes increasing a ratio of engine braking torque to regenerative braking torque applied to the vehicle during the downhill travel while applying the engine braking torque earlier in response to the operator input being received, and decreasing the ratio of engine braking torque to regenerative braking torque applied to the vehicle while applying the regenerative braking torque earlier in response to no operator input being received.

5. The method of claim 1, further comprising adjusting a rate of charging the battery based on the estimated grade and the operator input.

6. The method of claim 5, wherein the adjustment includes charging the battery at a lower rate in response to an operator input being received, and charging the battery at a higher rate in response to no operator input being received.

7. A method for a hybrid electric vehicle, comprising:
during downhill travel,
applying an engine braking torque, an amount and timing of the engine braking torque based on an estimated grade of the downhill travel and an operator input received via an input device separate from accelerator and brake pedals; and
maintaining a predetermined vehicle speed via applying a regenerative braking torque based on deviations from the predetermined vehicle speed during the downhill travel.

8. The method of claim 7, wherein the engine braking torque is not adjusted based on the deviations from the predetermined vehicle speed.

9. The method of claim 7, wherein the engine braking torque is maintained during the downhill travel while the regenerative braking torque is adjusted based on the deviations.

10. The method of claim 7, wherein the hybrid electric vehicle includes an engine, an electric motor, and a transmission coupled to the engine, and wherein a transmission gear is not shifted while maintaining the predetermined vehicle speed during the downhill travel, and further wherein the operator input is automatically cancelled in response to the estimated grade being less than a threshold or an increased engine torque request from an operator.

11. The method of claim 10, wherein the electric motor is powered via a battery, and further comprising adjusting a rate of charging of the battery based on the estimated grade and the operator input during the downhill travel.

12. The method of claim 11, wherein the operator input is indicative of a distance and/or duration of the downhill travel, and wherein the adjustment includes, as the distance and/or duration indicated by the operator input increases, decreasing the rate of charging of the battery.

13. A method for a vehicle including an engine and a battery, comprising:
during a first downhill condition, applying engine braking torque at a first time since a first pedal foot-off event and charging the battery at a first rate; and
during a second downhill condition, applying engine torque at a second time since a second pedal foot-off event and charging the battery at a second rate, the second time later than the first time, the second rate higher than the first rate.

14. The method of claim 13, wherein a first duration of downhill travel during the first downhill condition is longer than a second duration of downhill travel during the second downhill condition, and wherein an estimated grade of downhill travel during the first downhill condition is same as the estimated grade of downhill travel during the second downhill condition.

15. The method of claim 13, wherein a first estimated grade of downhill travel during the first downhill condition is greater than a second estimated grade of downhill travel during the second downhill condition, and wherein a duration of downhill travel during the first downhill condition is same as the duration of downhill travel during the second downhill condition.

16. The method of claim 13, wherein during the first downhill condition, the vehicle is operated in a first downhill travel mode, and wherein during the second downhill condition, the vehicle is operated in a second downhill travel mode, the first downhill travel mode different from the second downhill travel mode.

17. The method of claim 16, wherein the first downhill condition is determined based on an operator input indicating a mountain-driving mode request.

18. The method of claim 13, wherein during the first condition, the downhill travel includes a first, higher change in barometric pressure since a preceding uphill travel, and wherein during the second condition, the downhill travel includes a second, lower change in barometric pressure since the preceding uphill travel.

19. The method of claim 13, wherein the engine is coupled to a transmission, and further comprising,
during the first condition, maintaining a transmission gear; and
during the second condition, downshifting the transmission from a higher gear to a lower gear.

20. The method of claim 13, wherein during each of the first and second downhill conditions, a vehicle speed is maintained at a predetermined speed, the predetermined speed based on an estimated grade of a road and the position of one or more of a brake pedal and an accelerator pedal.

* * * * *